(12) United States Patent
Koermer et al.

(10) Patent No.: US 8,173,574 B2
(45) Date of Patent: May 8, 2012

(54) CATALYSTS TO REDUCE $NO_x$ IN AN EXHAUST GAS STREAM AND METHODS OF PREPARATION

(75) Inventors: Gerald S. Koermer, Basking Ridge, NJ (US); Ahmad Moini, Princeton, NJ (US); Howard Furbeck, Hamilton, NJ (US); Christopher R. Castellano, Ringoes, NJ (US)

(73) Assignee: BASF Corporation, Florham Park, NJ (US)

( * ) Notice: Subject to any disclaimer, the term of this patent is extended or adjusted under 35 U.S.C. 154(b) by 1056 days.

(21) Appl. No.: 11/857,896

(22) Filed: Sep. 19, 2007

(65) Prior Publication Data

US 2008/0069741 A1 Mar. 20, 2008

Related U.S. Application Data

(60) Provisional application No. 60/826,267, filed on Sep. 20, 2006.

(51) Int. Cl.
*B01J 23/48* (2006.01)
*B01D 50/00* (2006.01)
(52) U.S. Cl. .......... 502/348; 502/344; 422/171
(58) Field of Classification Search .......... 422/168, 422/177, 180
See application file for complete search history.

(56) References Cited

U.S. PATENT DOCUMENTS

| | | | |
|---|---|---|---|
| 3,554,929 A * | 1/1971 | Aarons | ......... 502/178 |
| 3,953,368 A | 4/1976 | Sinfelt | |
| 4,229,319 A | 10/1980 | Antos | |
| 4,322,458 A | 3/1982 | Siebmanns | |
| 4,341,664 A | 7/1982 | Antos | |
| 4,536,482 A | 8/1985 | Carcia | |
| 4,539,308 A | 9/1985 | Kukes et al. | |
| 5,489,565 A | 2/1996 | Cheung et al. | |
| 5,593,933 A | 1/1997 | Chattha | |
| 5,744,112 A | 4/1998 | Irite et al. | |
| 5,880,196 A | 3/1999 | Cho et al. | |
| 5,977,012 A | 11/1999 | Kharas et al. | |
| 5,980,844 A * | 11/1999 | Kharas | ....... 423/213.2 |
| 6,074,973 A | 6/2000 | Lampert et al. | |
| 6,153,162 A | 11/2000 | Fetzer et al. | |
| 6,176,079 B1 | 1/2001 | Konrad et al. | |
| 2005/0085380 A1 | 4/2005 | Lockemeyer | |
| 2005/0137083 A1 | 6/2005 | Rocha | |
| 2006/0108262 A1 * | 5/2006 | Takatsu et al. | ........ 208/189 |
| 2008/0069743 A1 | 3/2008 | Castellano et al. | |
| 2008/0070778 A1 | 3/2008 | Castellano et al. | |

FOREIGN PATENT DOCUMENTS

| | | |
|---|---|---|
| EP | 0070736 A1 | 1/1983 |
| EP | 0667182 | 8/1995 |
| WO | WO97/22476 | 6/1997 |
| WO | WO-00/00272 | 1/2000 |
| WO | WO 01/12320 A1 | 2/2001 |

OTHER PUBLICATIONS

Gang et al., "Low temperature selective oxidation of ammonia to nitrogen on silver-based catalysts", Applied Catalysis, B Environmental (2003), pp. 101-110.*
"Non-Final Office Action in U.S. Appl. No. 11/533,593", (Apr. 3, 2009),14 pgs.
"Final Office Action in U.S. Appl. No. 11/533,593", (Oct. 15, 2009),12 pgs.
"Non-Final Office Action in U.S. Appl. No. 11/533,631", (May 13, 2008),11 pgs.
"Non-Final Office Action in U.S. Appl. No. 11/533,631", (Dec. 17, 2008),6 pgs.
"Non-Final Office Action in U.S. Appl. No. 11/533,631", (Jun. 5, 2009),18 pgs.
IPRP and Written Opinion in PCT/US2007/079024, dated Apr. 2, 2009, 10 pp.
"Pines, Herman, et al., Alumina: Catalyst and Support. I. Alumina, its Intrinsic Acidity and Catalytic Activity", Journal of American Chemical Society, vol. 8 May 20, 1960, 2471-2483.
Naktsuji, et al., "Catalytic Reduction system of NOx in exhaust gases from diesel engines with secondary fuel injection", *Applied Catalysis, B Environmental* (1998) 17(4), 333-345.
Takagi, et al., "Selective reduction of NO on Ag/Al2O3 catalysts prepared from boehmite needles", *Catalysis Today 43* (1998), 123-127.

\* cited by examiner

*Primary Examiner* — Tom Duong
(74) *Attorney, Agent, or Firm* — Melanie L. Brown

(57) ABSTRACT

Catalysts, systems and methods are described to reduce $NO_x$ emissions of an internal combustion engine. In one embodiment, an emissions treatment system for an exhaust stream is provided having a catalyst comprising silver on a particulate alumina support, the silver having a diameter of less than about 20 nm. Methods of manufacturing catalysts are described in which ionic silver is impregnated on particulate hydroxylated alumina particles.

17 Claims, 3 Drawing Sheets

CATALYSTS TO REDUCE $NO_x$ IN AN EXHAUST GAS STREAM AND METHODS OF PREPARATION

CROSS-REFERENCE TO RELATED APPLICATIONS

This application claims the benefit of priority under 35 U.S.C. §119(e) to U.S. Provisional Application Ser. No. 60/826,267, filed Sep. 20, 2006 the disclosure of which is hereby incorporated herein by reference thereto.

GOVERNMENT CONTRACT RIGHTS

The U.S. Government has a paid-up license in this invention and the right in limited circumstances to require the patent owner to license others on reasonable terms as provided for by the terms of DE-FC26-02NT41218 awarded by the U.S. Department of Energy.

TECHNICAL FIELD

This invention pertains generally to exhaust emissions treatment systems and catalysts for internal combustion engines and methods for their manufacture and use with lean burn engines, including diesel engines and lean burn gasoline engines.

BACKGROUND OF THE INVENTION

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their durability, and their ability to generate high torque at low speed. However, exhaust from lean burn gasoline engines is characterized by relatively high emissions of $NO_x$ as compared to conventional gasoline engines that operate at or close to stoichiometric air/fuel conditions. Effective abatement of $NO_x$ from lean burn engines is difficult to achieve because high $NO_x$ conversion rates typically require reductant-rich conditions. Conversion of the $NO_x$ component of exhaust streams to innocuous components generally requires specialized $NO_x$ abatement strategies for operation under fuel lean conditions.

Efficient reduction of nitrogen oxides ($NO_x$=NO+$NO_2$) from diesel and lean-burn gasoline exhaust is important to meet future emission standards and improve vehicle fuel economy. Reduction of $NO_x$ emissions from an exhaust feedstream containing excess oxygen to meet various regulatory requirements is a challenge for vehicle manufacturers. For example, it is estimated that compliance with Bin 5 regulations in the United States may require an aftertreatment system capable of 70-90% $NO_x$ conversion efficiency on the FTP (Federal Test Procedure) cycle based on currently anticipated engine-out $NO_x$ levels. One such strategy for the abatement of $NO_x$ in the exhaust stream from lean burn engines uses $NO_x$ storage reduction (NSR) catalysts, which are also known in the art as "$NO_x$ traps." NSR catalysts contain $NO_x$ sorbent materials capable of adsorbing or "trapping" oxides of nitrogen under lean conditions and platinum group metal components to provide the catalyst with oxidation and reduction functions. In operation, the NSR catalyst promotes a series of elementary steps which are depicted below in Equations 1-5. In an oxidizing environment, NO is oxidized to $NO_2$ (Equation 1), which is an important step for $NO_x$ storage. At low temperatures, this reaction is typically catalyzed by the platinum group metal component, e.g., a platinum component. The oxidation process does not stop here. Further oxidation of $NO_2$ to nitrate, with incorporation of an atomic oxygen, is also a catalyzed reaction (Equation 2). There is little nitrate formation in absence of the platinum group metal component even when $NO_2$ is used as the $NO_x$ source. The platinum group metal component has the dual functions of oxidation and reduction. For its reduction role, the platinum group metal component first catalyzes the release of $NO_x$ upon introduction of a reductant, e.g., CO (carbon monoxide) or HC (hydrocarbon) (Equation 3) to the exhaust. This step may recover some $NO_x$ storage sites but does not contribute to any reduction of $NO_x$ species. The released $NO_x$ is then further reduced to gaseous $N_2$ in a rich environment (Equations 4 and 5). $NO_x$ release can be induced by fuel injection even in a net oxidizing environment. However, the efficient reduction of released $NO_x$ by CO requires rich conditions. A temperature surge can also trigger $NO_x$ release because metal nitrate is less stable at higher temperatures. $NO_x$ trap catalysis is a cyclic operation. Metal compounds are believed to undergo a carbonate/nitrate conversion, as a dominant path, during lean/rich operations.

Oxidation of NO to $NO_2$ $$NO + \tfrac{1}{2}O_2 \rightarrow NO_2 \tag{1}$$

$NO_x$ Storage as Nitrate $$2NO_2 + MCO_3 + \tfrac{1}{2}O_2 \rightarrow M(NO_3)_2 + CO_2 \tag{2}$$

$NO_x$ Release $$M(NO_3)_2 + 2CO \rightarrow MCO_3 + NO_2 + NO + CO_2 \tag{3}$$

$NO_x$ Reduction to $N_2$ $$NO_2 + CO \rightarrow NO + CO_2 \tag{4}$$

$$2NO + 2CO \rightarrow N_2 + 2CO_2 \tag{5}$$

In Equations 2 and 3, M represents a divalent metal cation. M can also be a monovalent or trivalent metal compound in which case the equations need to be rebalanced.

While the reduction of NO and $NO_2$ to $N_2$ occurs in the presence of the NSR catalyst during the rich period, it has been observed that ammonia ($NH_3$) can also form as a by-product of a rich pulse regeneration of the NSR catalyst. For example, the reduction of NO with CO and $H_2O$ is shown below in equation (6).

Reduction of NO to $NH_3$ $$2NO + 5CO + 3H_2O \rightarrow 2NH_3 + 5CO_2 \tag{6}$$

This property of the NSR catalyst mandates that $NH_3$, which is itself a noxious component, must also now be converted to an innocuous species before the exhaust is vented to the atmosphere.

An alternative strategy for the abatement of $NO_x$ under development of mobile applications (including treating exhaust from lean burn engines) uses selective catalytic reduction (SCR) catalyst technology. The strategy has been proven effective as applied to stationary sources, e.g., treatment of flue gases. In this strategy, $NO_x$ is reduced with a reductant, e.g., $NH_3$, to nitrogen ($N_2$) over an SCR catalyst that is typically composed of base metals. This technology is capable of $NO_x$ reduction greater than 90%, thus it represents one of the best approaches for achieving aggressive $NO_x$ reduction goals.

Ammonia is one of the most effective reductants for $NO_x$ at lean condition using SCR technologies. One of the approaches being investigated for abating $NO_x$ in diesel engines (mostly heavy duty diesel vehicles) utilizes urea as a reductant. Urea, which upon hydrolysis produces ammonia, is injected into the exhaust in front of an SCR catalyst in the temperature range 200-600° C. One of the major disadvantages for this technology is the need for an extra large reservoir to house the urea on board the vehicle. Another significant concern is the commitment of operators of these vehicles to replenish the reservoirs with urea as needed, and the requirement of an infrastructure for supplying urea to the operators. Therefore, less burdensome and alternative sources for supplying the reductant $NH_3$ for the SCR treatment of exhaust gases are desirable.

Emissions treatment systems that utilize the catalytic reduction of $NO_x$ in the exhaust to generate $NH_3$, in place of an external reservoir of $NH_3$ or $NH_3$ precursor are known in the art. In other words, a portion of the $NO_x$ component of the exhaust is used as an $NH_3$ precursor in such systems. For instance, U.S. Pat. No. 6,176,079 discloses a method for treating an exhaust gas from a combustion system that is operated alternately in lean and rich conditions. In the method, nitrogen oxides are intermediately stored during lean operation, and released during rich operation to form $NH_3$ that is stored. The stored $NH_3$ can be released, and thereby reduce nitrogen oxides during a subsequent lean operation.

Selective catalytic reduction of $NO_x$ using hydrocarbons (HC—SCR) has been studied extensively as a potential alternative method for the removal of $NO_x$ under oxygen-rich conditions. Ion-exchanged base metal zeolite catalysts (e.g., Cu-ZSM5) have typically not been sufficiently active under typical vehicle operating conditions, and are susceptible to degradation by sulfur dioxide and water exposure. Catalysts employing platinum-group metals (e.g., $Pt/Al_2O_3$) operate effectively over a narrow temperature window and are highly selective towards $N_2O$ production.

Catalytic devices using alumina-supported silver (Ag/$Al_2O_3$) have received attention because of their ability to selectively reduce $NO_x$ under lean exhaust conditions with a wide variety of hydrocarbon species. The use of hydrocarbons and alcohols, aldehydes and functionalized organic compounds over $Ag/Al_2O_3$ allows reduction of $NO_x$ at lower temperatures. In addition to the molecules listed above, diesel fuel could also be used as a reductant. Diesel fuel does not require additional tanks for diesel-powered vehicles. The diesel fuel can be supplied to the emissions system by changing engine management or by supplying an additional injector of diesel fuel to the emission train.

Despite these various alternatives, there is no commercially available practical hydrocarbon SCR catalyst. Therefore, there is a need for an effective catalyst to selectively reduce $NO_x$ in an exhaust gas stream for vehicles and other applications of lean-burn internal combustion engines and a commercially viable method for producing such catalysts.

SUMMARY OF THE INVENTION

In accordance with an embodiment of the invention, a catalyst for reducing NOx emissions from an exhaust gas stream of a lean burn engine is provided, which comprises silver supported on alumina.

According to one or more embodiments, ionic silver is impregnated on the surface of the hydroxylated alumina and the resulting silver is well-dispersed on the surface of the alumina. By "well-dispersed" it is meant that the silver is not extensively clustered and is spread on the surface of the alumina in small entities. According to an embodiment of the invention, the silver is less than or equal to about 20 nm in diameter. In certain embodiments, the silver is less than about 10 nm in diameter, in other embodiments, the silver is less than about 5 nm in diameter, and in still other embodiments, the silver is less than about 2 nm in diameter. In a specific embodiment, the silver is less than about 1 nm in diameter. In one or more embodiments, the catalyst is substantially free of silver metal and/or silver aluminate.

Another aspect of the invention pertains to an emissions treatment system for an exhaust stream comprising a catalyst according to the embodiments described above. The emissions treatment system may, according to one embodiment, further comprise a controller to periodically lower the air/fuel ratio in the exhaust stream upstream of the catalyst. In other embodiments, the controller comprises an injector that periodically meters a reducing agent selected from at least one of a hydrocarbon fuel, carbon monoxide and hydrogen into the exhaust stream upstream of the catalyst to form a rich gaseous stream.

The catalyst may be disposed on a ceramic or metallic honeycomb flow through substrate. The emission treatment system may further include two or more catalysts disposed on two or more ceramic or metallic honeycomb flow through substrate. In one or more embodiments, the emissions treatment system may further comprise a component selected from diesel oxidation catalyst, a catalyzed soot filter, a soot filter, a $NO_x$ trap, partial hydrocarbon oxidation catalyst, a sulfur trap, a precious metal catalyst disposed on a substrate, a phosphorous trap, and combinations or one or more thereof.

According to one or more embodiments of the emission treatment system, the catalyst is disposed on a soot filter and functions as a hydrocarbon SCR catalyst. In one or more embodiments, the soot filter is a wall flow filter. According to one embodiment, the soot filter is a wall flow filter comprising an inlet end, an outlet end and internal walls extending from the inlet end to the outlet end and defining a plurality of passages comprising inlet channel sides and outlet channel sides with alternate channels comprising inlet channels having open inlets and plugged outlets and outlet channels having open outlets and plugged inlets, wherein the catalyst is disposed on the outlet channel side. As a variant on this embodiment, the system may further include an NSR catalyst which extends from the inlet end for at least part of the distance from the open inlet toward the plugged outlet, and the SCR catalyst extends from the outlet end for at least part of the distance from the open outlet toward the plugged outlet. According to one embodiment, there is an inlet oxidation catalyst disposed as a layer on part of the NSR catalyst and extends from the inlet end for at least part of the distance from the open inlet toward the plugged outlet, and/or there is an outlet oxidation catalyst disposed as a layer on part of the SCR catalyst and extends from the outlet end for at least part of the distance from the open outlet toward the plugged outlet.

Another aspect of the invention pertains to a method of preparing a catalyst comprising providing a support comprising surface hydroxylated alumina; impregnating the support with a silver compound; drying the impregnated support; and calcining the impregnated support. The method may further include subjecting the resulting material to hydrothermal treatment.

According to one embodiment, the calcining is performed at a temperature of about 540° C. In another embodiment, the hydrothermal treatment is performed in about 10% steam in air. The calcining may be performed for about 1 to 48 hours. The hydrothermal treatment can be carried out at temperatures ranging from about 400° C. to 700° C., preferably at about 650° C., for about 1 to 48 hours. This treatment is generally carried out in an air stream containing 10% steam for at least about 1, typically about 16 hours. According to an embodiment of the invention, the silver is impregnated in an amount of between about 2% and 4% by weight on an oxide basis. The impregnation may be performed by an incipient wetness process.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the embodiments of which are described in detail and illustrated in the accompanying drawings which form a part hereof, and wherein.

DETAILED DESCRIPTION OF EMBODIMENTS OF THE INVENTION

Figure 1:
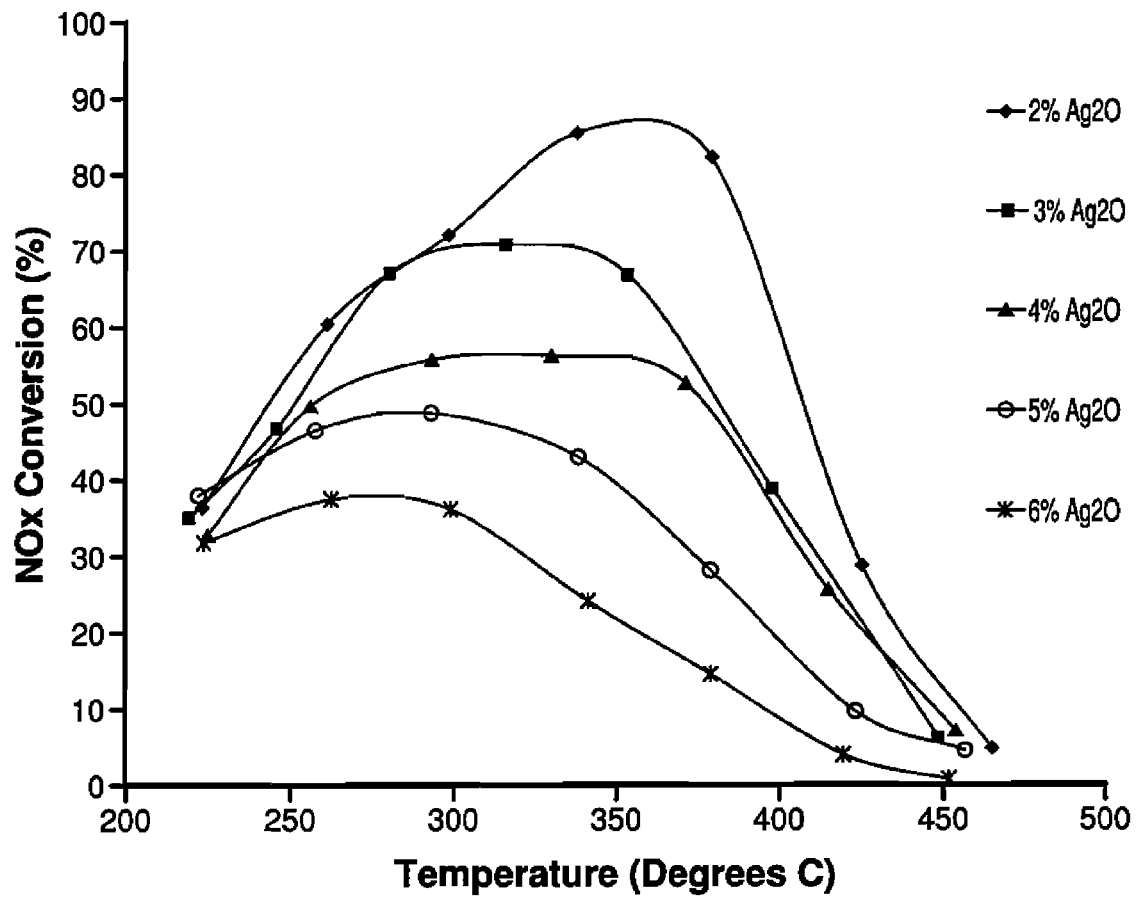
FIG. 1 is a graph showing the performance of samples containing 2%, 3%, 4%, 5% and 6% silver as $Ag_2O$ on alumina supports prepared in accordance with an embodiment of the present invention.

Before describing several exemplary embodiments of the invention, it is to be understood that the invention is not limited to the details of construction or process steps set forth in the following description. The invention is capable of other embodiments and of being practiced in various ways.

An exemplary silver-alumina catalyst comprises about 3 to 4 weight percent (wt. %) silver on an $Ag_2O$ basis supported on alumina. In one embodiment, the catalyst is prepared by depositing ionic silver on highly hydroxylated alumina. The catalysts tested in the Examples below were supported on a 400 cell per square inch cordierite monolith substrate.

Thus, according to one or more embodiments, a catalyst for reducing NOx emissions from an exhaust gas stream of a lean burn engine is provided which comprises silver supported on alumina which is prepared by impregnating ionic silver on a surface hydroxylated alumina support. As used herein, the term "hydroxylated" means that the surface of the alumina has a high concentration of surface hydroxyl groups in the alumina as it is obtained, for example boehmite, pseudoboehmite or gelatinous boehmite, diaspore, nordstrandite, bayerite, gibbsite, alumina having hydroxyl groups added to the surface, and mixtures thereof. Pseudoboehmite and gelatinous boehmite are generally classified as non-crystalline or gelatinous materials, whereas diaspore, nordstrandite, bayerite, gibbsite, and boehmite are generally classified as crystalline. According to one or more embodiments of the invention, the hydroxylated alumina is represented by the formula $Al(OH)_xO_y$ where $x=3-2y$ and $y=0$ to 1 or fractions thereof. In their preparation, such aluminas are not subject to high temperature calcination, which would drive off many or most of the surface hydroxyl groups.

According to embodiments of the present invention, substantially non-crystalline hydroxylated aluminas in the form of flat, plate-shaped particles, as opposed to needle-shaped particles, are useful in preparing catalysts. The shape of the hydroxylated alumina used in one or more embodiments of the present invention is in the form of a flat plate and has an average aspect ratio of 3 to 100 and a slenderness ratio of a flat plate surface of 0.3 to 1.0. The aspect ratio is expressed by a ratio of "diameter" to "thickness" of a particle. The term "diameter" as used herein means a diameter of a circle having an area equal to a projected area of the particle, which has been obtained by observing the alumina hydrate through a microscope or a Transmission Electron Microscope (TEM). The slenderness ratio means a ratio of a minimum diameter to a maximum diameter of the flat plate surface when observed in the same manner as in the aspect ratio.

Hydroxylated, flat, plate-shaped particulate aluminas which may be used in producing the catalysts according to embodiments of the invention are known and commercially available. Processes for producing them are also known. Exemplary processes for producing pseudoboehmite are described in, for example, U.S. Pat. No. 5,880,196 and PCT International Application No. WO 97/22476.

Pseudoboehmite has a boehmite-like structure. The X-ray diffraction pattern, however, consists of very diffuse bands or halos. The spacings of the broad reflections correspond approximately with the spacings of the principal lines of the pattern of crystalline boehmite, but the first reflection, in particular, commonly shows appreciable displacements to values as large as 0.66 to 0.67 nanometer compared with the 0.611 nanometer reflection for the 020 line for boehmite. It has been suggested that although the structure resembles that of boehmite in certain respects, the order is only of very short range. It is generally accepted by those skilled in the art that pseudoboehmite is a distinct phase which is different from boehmite. See Encyclopedia of Chemical Technology, $5^{th}$ Ed., Vol. 2, Wiley Inter science, 2004, pages 421-433, and "Oxides and Hydroxides of Aluminum," Alcoa Technical Paper No. 19, Revised, by Karl Wefers and Chanakya Misra, 1987, Copyright Aluminum Company of America.

Alternatively, a calcined alumina could be treated in a manner to add surface hydroxyl groups, for example, by exposing the alumina to steam for a period of time. In one or more embodiments, the alumina used for silver impregnation is substantially free of gamma alumina. The final catalyst after silver impregnation, drying, calcination, and/or hydrothermal treatment, may comprise gamma alumina or other high temperature alumina phases.

In one or more embodiments, the silver on the hydroxylated alumina is substantially free of silver metal and/or silver aluminate. As used herein, substantially free means that there is less than 0.1% by weight of silver metal or silver aluminate. As used herein, "sliver metal" means silver in the zero oxidation state, which means that the silver atom is neither positively nor negatively charged. The zero oxidation state is typically the oxidation state for aggregates of uncharged silver atoms or silver metal contrasted with positively charged silver, which is called "ionized silver" or "ionic silver." An ionic silver atom has a positive charge (+1) and is said to have a +1 oxidation state. Since elemental silver has a single electron in its outermost electron shell, Ag(I) or $Ag^{+1}$ is by far the most common oxidation state for ionic silver. If the silver atom accepts an electron from a more electropositive material it would then become negatively charged and said to have a −1 oxidation state, or alternatively be a negative ion or anion.

According to one or more embodiments, the supported silver has an average particle size of less than about 2 nm. In other embodiments, the particle size of the silver is less than about 1 nm.

Preparation of Catalyst Compositions

One aspect of the invention pertains to methods of preparing catalysts and catalyst compositions. Thus, a hydroxylated alumina is impregnated with ionic silver as described below.

As noted above, suitable aluminas include boehmite or pseudo boehmite/gelatinous alumina with surface area of at least about 20 m$^2$/g. According to one or more embodiments, the hydroxylated alumina is substantially free of gamma alumina. Impregnating the hydroxylated alumina with a water soluble, ionic form of silver such as silver acetate, silver nitrate, etc., and then drying and calcining the ionic silver-impregnated alumina at a temperature low enough to fix the silver and decompose the anion (if possible). Typically for the nitrate salt this would be about 450-550 degrees centigrade to provide an alumina that has substantially no silver particles greater than about 20 nm in diameter. In certain embodiments, the diameter of the silver is less than 10 nm, and in other embodiments, the silver is less than about 2 nm in diameter. In one or more embodiments, the processing is performed so that the silver is present in substantially ionic form and there is substantially no silver metal present as determined by UV spectroscopy. In one or more embodiments there is substantially no silver aluminate present. The absence of silver metal and silver aluminate was also confirmed by x-ray diffraction analysis. Following the calcination step, the catalyst is optionally subjected to a hydrothermal treatment in 10% steam in air. The hydrothermal treatment can be carried out at temperatures ranging from about 400 degrees centigrade to 700 degrees centigrade, preferably at about 650 degrees centigrade, for 1 to 48 hours.

The ionic silver is well-dispersed on the surface of the alumina. Transmission Electron Microscope (TEM) analysis of the samples prepared in accordance with embodiments of the invention showed the ionic silver had a size of less than 2 nm and therefore the ionic silver was well dispersed over the surface of the alumina particles.

It may also be desired to modify the hydroxylated alumina prior to impregnation with silver. This can be accomplished utilizing a variety of chemical reagents and/or processing treatments such as heat or steam treatments to modify the alumina surface properties and/or physical properties. This modification of the alumina properties may improve the performance properties of the catalyst for properties such as activity, stability, silver dispersion, sintering resistance, resistance to sulfur and other poisoning, etc. However, the processing should be performed so that chemical modification of the alumina surface does not substantially negatively impact the silver-alumina interaction.

The deposition of silver onto the surface of alumina can be achieved by various impregnation methods, including incipient wetness and wet impregnation. In the wet impregnation process, an excess amount of solution is mixed with the support, followed by evaporation of the excess liquid. The deposition of silver can also be achieved by other coating techniques such as chemical vapor deposition.

Emissions Treatment Systems

The emission treatment systems according to one or more embodiments of the invention may include the silver on alumina NO$_x$ reduction catalyst described above and various other components. Thus, the silver on alumina catalyst may be contained on multiple monoliths or substrates with one or more of the substrates containing in part or entirely the silver on alumina catalyst. The silver on alumina catalyst may be part of a hydrocarbon SCR(HC SCR) system where the hydrocarbons are supplied by engine controls or engine management. Alternatively, the silver on alumina catalyst may be part of an HC SCR system in which the hydrocarbons are supplied by a separate injection device. In another embodiment, an HC SCR system can have hydrogen added to the exhaust system, for example using a POX reactor, an on board supply of hydrogen, or by using compounds or complexes that release hydrogen when they are decomposed. An HC SCR system may be provided in which 1% or more of the reductant contains an oxygenated carbon containing molecule such as an aldehyde, alcohol or carbon monoxide. The NO$_x$ catalysts described above may be part of a system that includes one or more additional components of an exhaust system including, but not limited to diesel oxidation catalysts, catalyzed soot filters, soot filters, NO$_x$ traps, NSR catalysts, partial hydrocarbon oxidation catalysts, air pumps, external heating devices, precious metal catalysts, sulfur traps, phosphorous traps, etc.

The emissions treatment system can include the silver on alumina catalyst described above to treat NO$_x$. The silver on alumina catalyst can be located downstream of an NSR catalyst. The silver on alumina catalyst can be in the form of self-supporting catalyst particles or as a honeycomb monolith formed of the SCR catalyst composition. In one or more embodiments, the silver on alumina catalyst composition is disposed as a washcoat or as a combination of washcoats on a ceramic or metallic substrate, preferably a honeycomb flow through substrate.

According to one or more embodiments, when deposited on the honeycomb monolith substrates, such silver on alumina catalyst compositions are deposited at a concentration of at least 1 g/in$^3$ to ensure that the desired NO$_x$ reduction is achieved and to secure adequate durability of the catalyst over extended use. In one embodiment, there is at least 1.6 g/in$^3$ of SCR composition, and in particular, there is at least 1.6 to 5.0 μl in$^3$ of the SCR composition disposed on the monolith.

Substrates

In one or more embodiments, one or more catalyst compositions are disposed on a substrate. The substrate may be any of those materials typically used for preparing catalysts, and will preferably comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 600 or more gas inlet openings (i.e., cells) per square inch of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). Either NSR and/or SCR catalyst composition can be coated on the wall-flow filter. If such substrate is utilized, the resulting system will be able to remove particulate matters along with gaseous pollutants. The wall-flow filter substrate can be made from materials commonly known in the art, such as cordierite or silicon carbide.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The substrates useful for the catalysts of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface of the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

In alternative embodiments, one or more catalyst compositions may be deposited on an open cell foam substrate. Such substrates are well known in the art, and are typically formed of refractory ceramic or metallic materials.

Preparation of Washcoats

The catalyst compositions of the present invention may be readily prepared by processes well known in the prior art. A representative process for preparing a bi-layer washcoat set forth below. It will be understood that the process below can be varied according to different embodiments of the invention to prepare single layer washcoats, by omitting the step of applying the second layer, or to add one or more additional layers to the bi-layer washcoat described below.

The catalyst composite can be readily prepared in one or more layers on a monolithic honeycomb substrate. For a bi-layer washcoat, the bottom layer, finely divided particles of a high surface area refractory metal oxide such as gamma alumina are slurried in an appropriate vehicle, e.g., water. The substrate may then be dipped one or more times in such slurry or the slurry may be coated on the substrate (e.g., honeycomb flow through substrate) such that there will be deposited on the substrate the desired loading of the metal oxide. Components such as the silver metals, precious metals or platinum group metals, transition metal oxides, stabilizers, promoters and the $NO_x$ sorbent component may be incorporated in the slurry as a mixture of water soluble or water-dispersible compounds or complexes. Thereafter, the coated substrate is typically calcined by heating, e.g., at 400 to 600° C. for 1 to 3 hours.

In one or more embodiments, the slurry is comminuted to result in substantially all of the solids having particle sizes of less than 20 microns, e.g., 1-15 microns, in an average diameter. The commination may be conducted in a ball mill or other similar equipment, and the solids content of the slurry may be, e.g., 20-60 wt. %, preferably 35-45 wt. %.

The following examples further illustrate the present invention, but of course, should not be construed as in any way limiting its scope.

EXAMPLES

Catalyst Preparation

The catalysts were prepared by standard incipient wetness impregnation techniques using the following procedure. A 1M solution of silver nitrate was prepared using deionized water. The resulting solution was stored in a dark bottle away from light sources. The available pore volume of the various supports was determined by titrating the bare support with water while mixing until incipient wetness was achieved. This resulted in a liquid volume per gram of support. Using the final target $Ag_2O$ level and the available volume per gram of support, the amount of 1M $AgNO_3$ solution needed is calculated. DI water is added to the silver solution, if needed, so that the total volume of liquid is equal to amount needed to impregnate the support sample to incipient wetness. If the amount of $AgNO_3$ solution needed exceeds the pore volume of the support, then multiple impregnations are done.

The appropriate $AgNO_3$ solution is added slowly to the support with mixing. After incipient wetness is achieved, the resulting solid is dried at 90° C. for 16 h, then calcined at 540° C. for 2 hours. In each of the examples below, the catalyst is also optionally subjected to a flowing stream of about 10% steam in air for at least about, typically about 16 hours at 650° C.

Catalyst Evaluation

Catalyst performance was evaluated in two ways. The first option involves using a microchannel catalytic reactor containing a bed of approximately 12.6 mm$^3$ of catalyst. The flow rate (standard temperature and pressure) of 15 sccm of reactants (at the concentration shown in Table 1, below) plus 0.75 sccm steam was passed over the bed at various temperatures (150, 175, 200, 225, 250, 300, 350, 400, 500° C.) to determine the reactivity of the catalyst. Conversion of $NO_x$ was determined by $100*(NO_x$ fed-$NO_x$ out)/($NO_x$ fed) using a mass spectral analyzer.

TABLE 1

| Species | Concentration |
|---|---|
| $NO_x$ | 400 ppm |
| $O_2$ | 10% |
| $CO_2$ | 5% |
| HC (C1) | 4000 ppm |
| C1/N | 10 |
| CO | 745 ppm |
| $H_2$ | 245 ppm |
| He | balance |
| $H_2O$ as % of dry Air flow | 5% |

Catalyst was also evaluated by washcoating the catalyst powder onto a small cylindrical cordierite monolith (¾" diameter×1.0" length) of 400 cells/in$^3$ by dip-coating the monolith into an aqueous slurry of the catalyst by standard techniques. Final catalyst loading was typically 2.5-3.0 g/in$^3$. Catalysts are compared in the examples below at similar loadings and equivalent space velocities.

Analysis of the performance of these samples was accomplished by using a tubular flow through reactor. A simulated exhaust gas feedstream was passed through a sample of the Ag—Al catalyst on 400 cell-per-square inch cordierite monolith substrate, using simulated diesel fuel. The reactor system was instrumented with appropriate sensors, including a Fourier transform infrared spectrometer to determine $NO_x$ concentration levels (and other species) entering/exiting the SCR catalyst, and a flow meter to determine exhaust flow rate translatable to catalyst space velocity (SV). Space velocity represents a rate of feed of gas, in volume, per unit volume of the catalyst, and has a unit of inverse hour (h$^{-1}$). Baseline laboratory conditions included the following standard gases in the simulated exhaust feedstream: 10% $O_2$, 5% $CO_2$, 5% $H_2O$, 750 parts per million (hereinafter 'ppm') CO, and 250 ppm $H_2$. A simulated diesel fuel mixture was used as the $NO_x$ reductant for all laboratory reactor work and consisted of a volumetric mixture of n-dodecane (67 vol. %, long-chain alkane) and m-xylene (33 vol. %, aromatic).

In all of the following examples, after calcination, the catalysts were treated in 10% steam at 650° C. for 16 hours.

Example 1

Comparison of Pseudoboehmite to Boehmite

Catalysts were prepared using commercially available pseudoboehmite (Catapal® C1, 270 m²/g, 0.41 cc/g pore volume, 6.1 nm average pore diameter, produced by Sasol, North America) and boehmite (P200 (from Sasol), 100 m²/g, 0.47 cc/g pore volume, 17.9 nm average pore diameter) alumina supports. The silver content of the finished catalyst was 1% on an $Ag_2O$ basis. At 400° C. the relative conversions of $NO_x$ were 1.0 and 0.69. Thus the pseudoboehmite was about 30% more active than boehmite.

Example 2

Catalysts were prepared using a commercially available boehmite and commercially available pseudoboehmite (HiPal 10 available from Engelhard Corporation, Iselin, N.J.). The silver content of the finished catalyst was 2% on an $Ag_2O$ basis. The relative activities at 400° C. are shown in Table 2 below.

TABLE 2

| Support | Relative Conversion |
|---|---|
| Pseudoboehmite | 1.0 |
| Delta/theta alumina | 0.74 |
| HiPal-10 | 0.81 |

Example 3

Effect of Ag Concentration

Silver catalysts were prepared from a pseudoboehmite support at $Ag_2O$ levels of 2, 3, 4, 5 and 6%. These materials were then washcoated onto a cordierite monolith and tested in a laboratory reactor as specified above using simulated diesel fuel, 106 ppm NO, 8% $O_2$ and a C1:N ratio of 8. The resulting graph of conversion versus temperature shown in FIG. 1 indicates that the 2% catalyst performed best.

Example 4

Transmission Electron Microscope (TEM) Analysis of Samples

Figure 2:
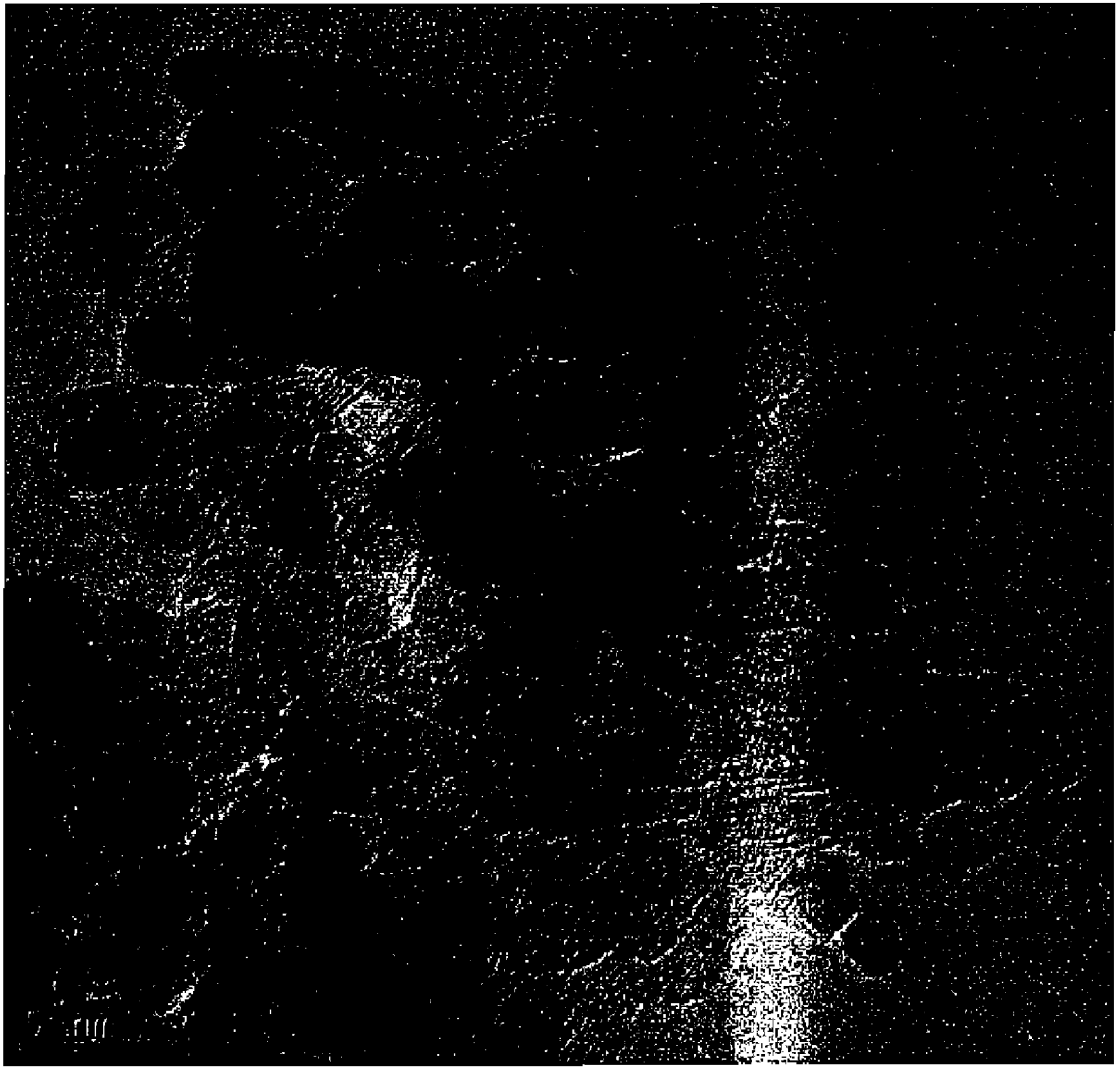
FIG. 2 is a transmission electron microscope microphotograph of a sample prepared in accordance with an embodiment of the present invention.
Figure 3:
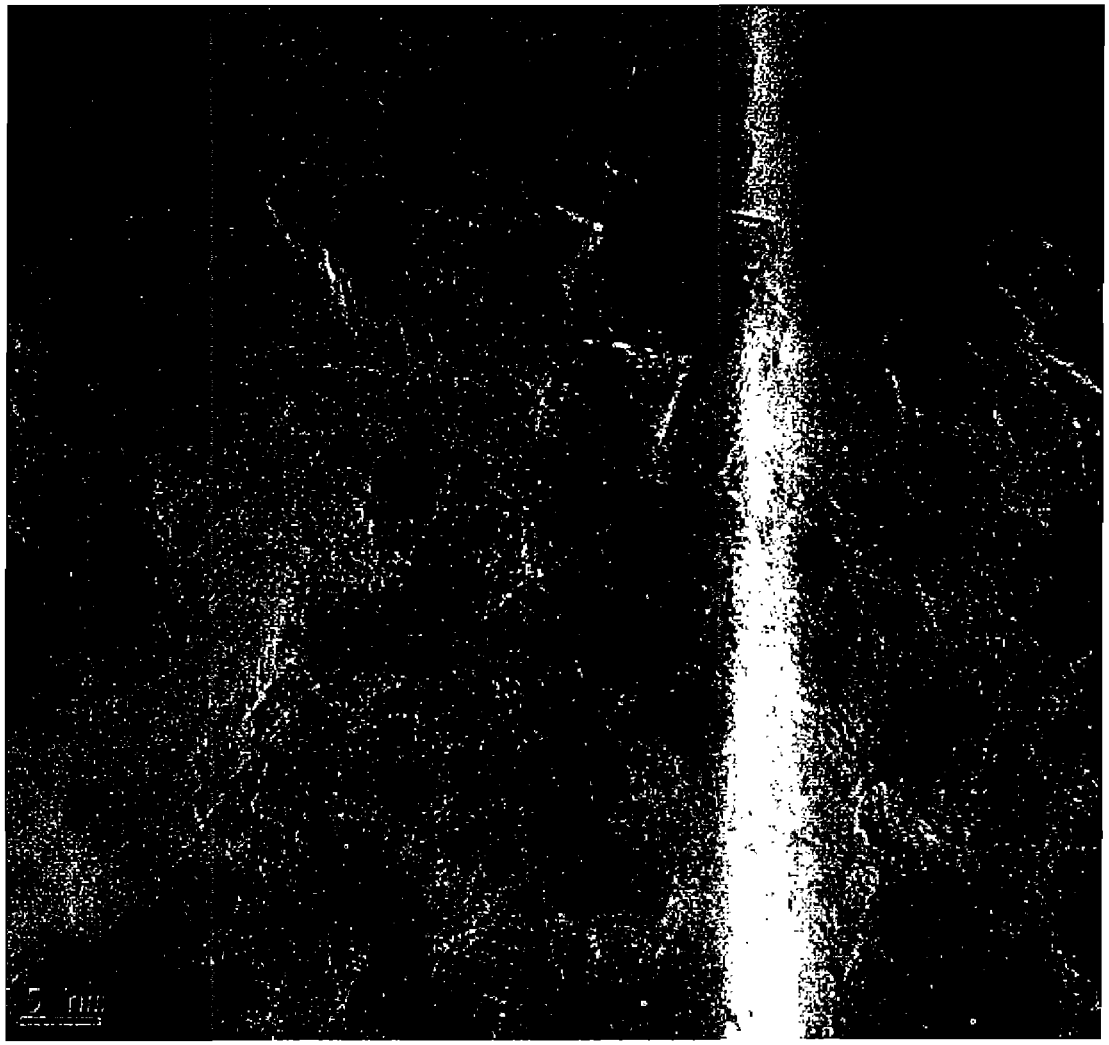
FIG. 3 is a transmission electron microscope microphotograph of a sample prepared in accordance with an embodiment of the present invention.

TEM images were obtained from thin slices of silver catalysts starting with pseudoboehmite support with 2% and 6% silver as silver oxide. Both catalysts were hydrothermally treated. Samples were prepared as dry powders dispersed (without solvent) on a lacy carbon coated Cu support grid. Data were collected with a JEOL 2011 Transmission Electron Microscope operating at 200 Kv with a LaB6 filament. A Gatan 2 K CCD camera was used for digital image collection. FIG. 2 shows the 2% sample and FIG. 3 shows the 6% sample. In both cases, the silver is so well dispersed that no crystallites of silver are observed. No silver particles present were greater than 1-2 nm in diameter.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed:

1. A catalyst for reducing NOx emissions from an exhaust gas stream of a lean burn engine comprising silver dispersed on alumina particles, the silver having a diameter of less than about 20 nm, wherein the catalyst is prepared by impregnation of the silver on the surface of hydroxylated alumina particles, the alumina being represented by the formula $Al(OH)_xO_y$, where $x=3-2y$ and $y=0$ to 1 or fractions thereof.

2. The catalyst of claim 1, wherein the silver has a diameter less than about 10 nm.

3. The catalyst of claim 1, wherein the catalyst is substantially free of silver metal.

4. The catalyst of claim 3, wherein the catalyst is substantially free of silver aluminate.

5. The catalyst of claim 1, wherein the alumina particles are plate-shaped and the silver has a diameter less than about 2 nm.

6. The catalyst of claim 1, wherein the catalyst is prepared by impregnation of ionic silver on the surface of the hydroxylated alumina particles.

7. The catalyst of claim 6, wherein the hydroxylated alumina includes pseudoboehmite.

8. The catalyst of claim 7, wherein the pseudoboehmite is in the form of plate-shaped particles.

9. The catalyst of claim 1, wherein the alumina is selected from boehmite, pseudo boehmite or gelatinous boehmite, diaspore, nordstrandite, bayerite, gibbsite, alumina having hydroxyl groups added to the surface, and mixtures thereof.

10. The catalyst of claim 1, wherein the silver is well dispersed on the alumina particles.

11. The catalyst of claim 1, wherein the loading of the silver on the catalyst is between about 2% and 4% by weight.

12. An emissions treatment system for an exhaust stream comprising a catalyst according to claim 11.

13. The emissions treatment system of claim 12, wherein the catalyst is disposed on a ceramic or metallic honeycomb flow through substrate.

14. The emissions treatment system of claim 13, wherein the system includes a second catalyst disposed on a second ceramic or metallic honeycomb flow through substrate.

15. The emissions treatment system of claim 14, further comprising a component selected from diesel oxidation catalyst, a catalyzed soot filter, a soot filter, a $NO_x$ trap, partial hydrocarbon oxidation catalyst, a sulfur trap, a precious metal catalyst disposed on a substrate, a phosphorous trap, and combinations or one or more thereof.

16. An emissions treatment system for an exhaust stream comprising a catalyst according to claim 1.

17. A catalyst for reducing NOx emissions from an exhaust gas stream of a lean burn engine comprising silver dispersed on alumina particles, the silver having a diameter of less than about 20 nm, wherein the catalyst is prepared by impregnation of the silver on the surface of boehmite, pseudo boehmite or gelatinous boehmite, diaspore, nordstrandite, bayerite, gibbsite, alumina having hydroxyl groups added to the surface, or mixtures thereof.

* * * * *